United States Patent [19]

Noro

[11] 4,433,369

[45] Feb. 21, 1984

[54] POWER SUPPLY CIRCUIT FOR ELECTRICAL APPARATUS

[75] Inventor: Masao Noro, Hamamatsu, Japan

[73] Assignee: Nippon Gakki Seizo Kabushiki Kaisha, Hamamatsu, Japan

[21] Appl. No.: 359,162

[22] Filed: Mar. 17, 1982

[30] Foreign Application Priority Data

Mar. 24, 1981 [JP] Japan .................... 56-042775

[51] Int. Cl.³ .............................................. H02P 13/26
[52] U.S. Cl. .................................................. 363/84
[58] Field of Search .............. 323/246, 300, 217, 237, 323/282; 363/127, 128, 86, 88, 67, 69, 70, 84

[56] References Cited

U.S. PATENT DOCUMENTS

| | | | |
|---|---|---|---|
| 3,622,849 | 11/1971 | Kelly, Jr. et al. | 323/246 X |
| 4,302,717 | 11/1981 | Olla | 323/282 |
| 4,323,845 | 4/1982 | Leach | 323/285 X |

Primary Examiner—William M. Shoop
Attorney, Agent, or Firm—Spensley, Horn, Jubas & Lubitz

[57] ABSTRACT

In a power supply circuit designed so that an AC voltage is applied to the primary side of a transformer, and that the voltage derived on the secondary side thereof is rectified and smoothed, arrangement is provided that the AC voltage applied to the primary side is subjected to switching at least twice in each half cycle thereof to insure that the current which flows on the primary side is timewisely divided, whereby the peak value of the current flowing on the primary side of the transformer is suppressed to a small level. Thus, it is possible to realize a substantial reduction of noises as a result of minimized dI/dt and current value and also to realize a substantial reduction of power loss as a result of minimized current value.

13 Claims, 36 Drawing Figures

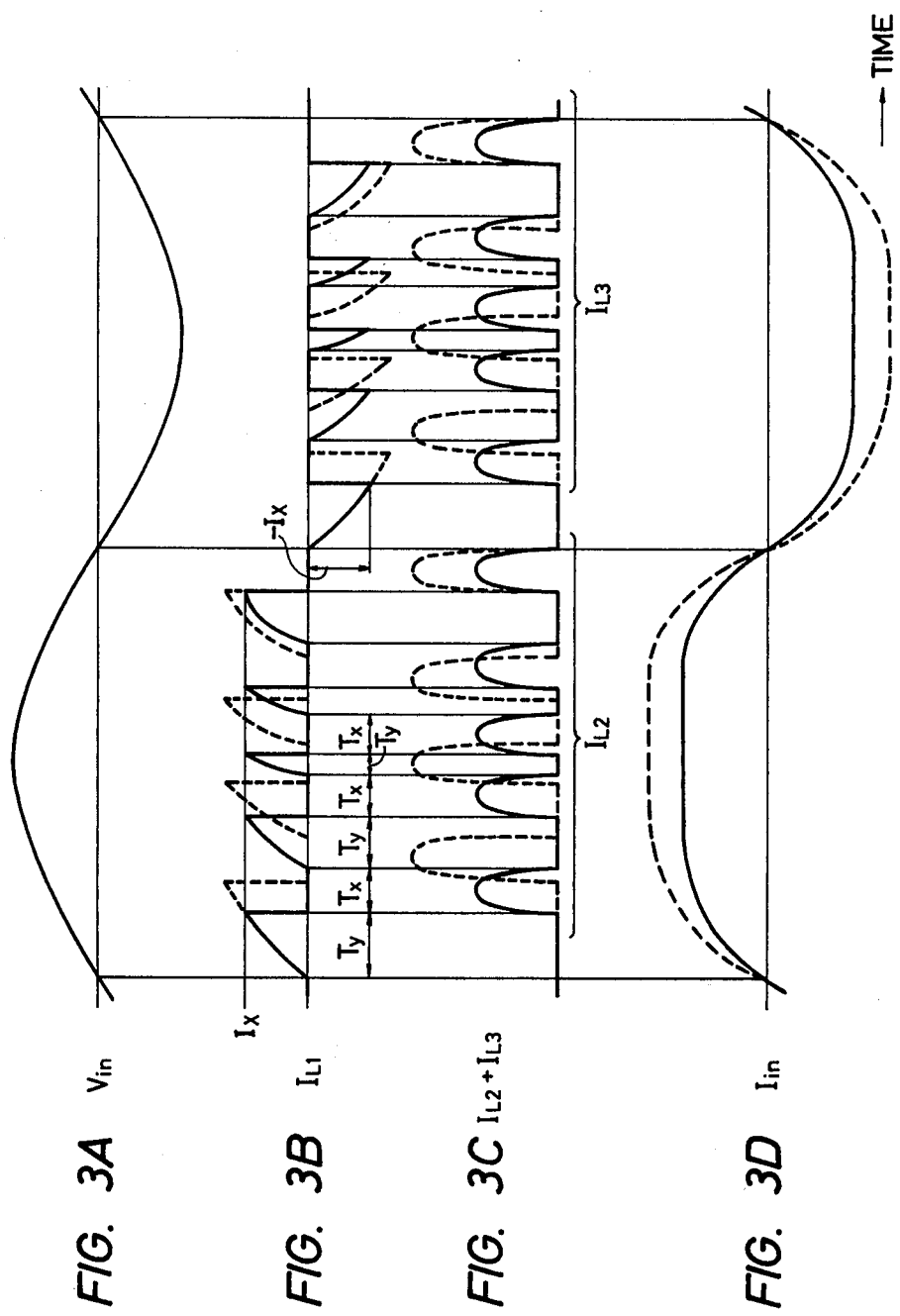

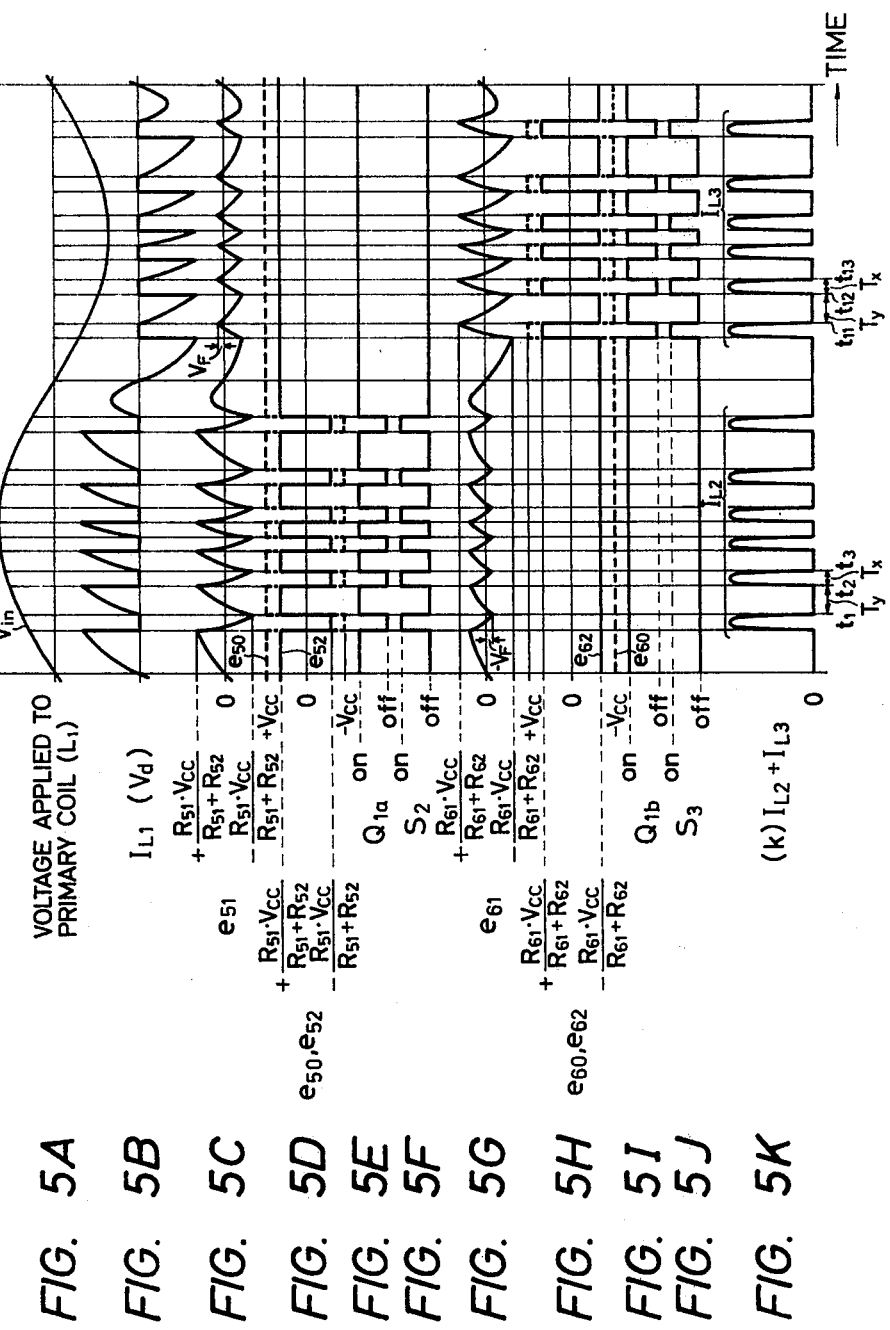

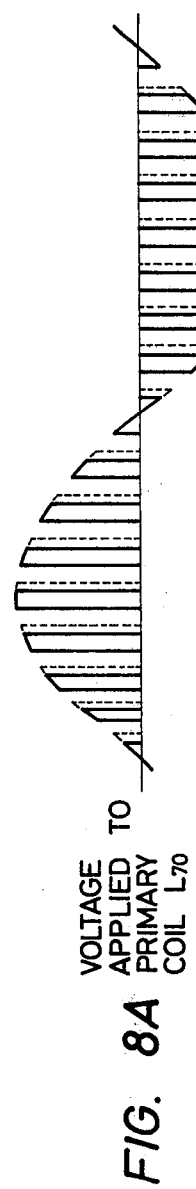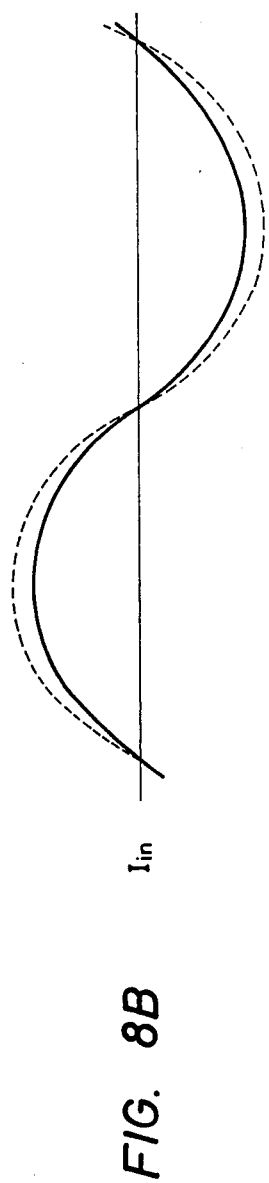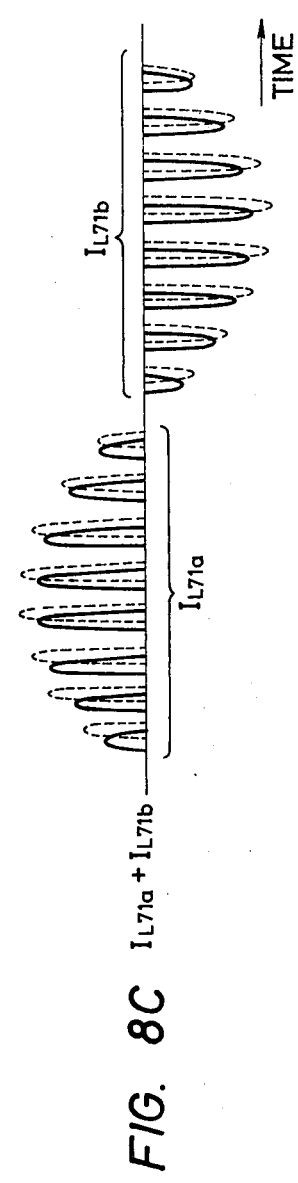

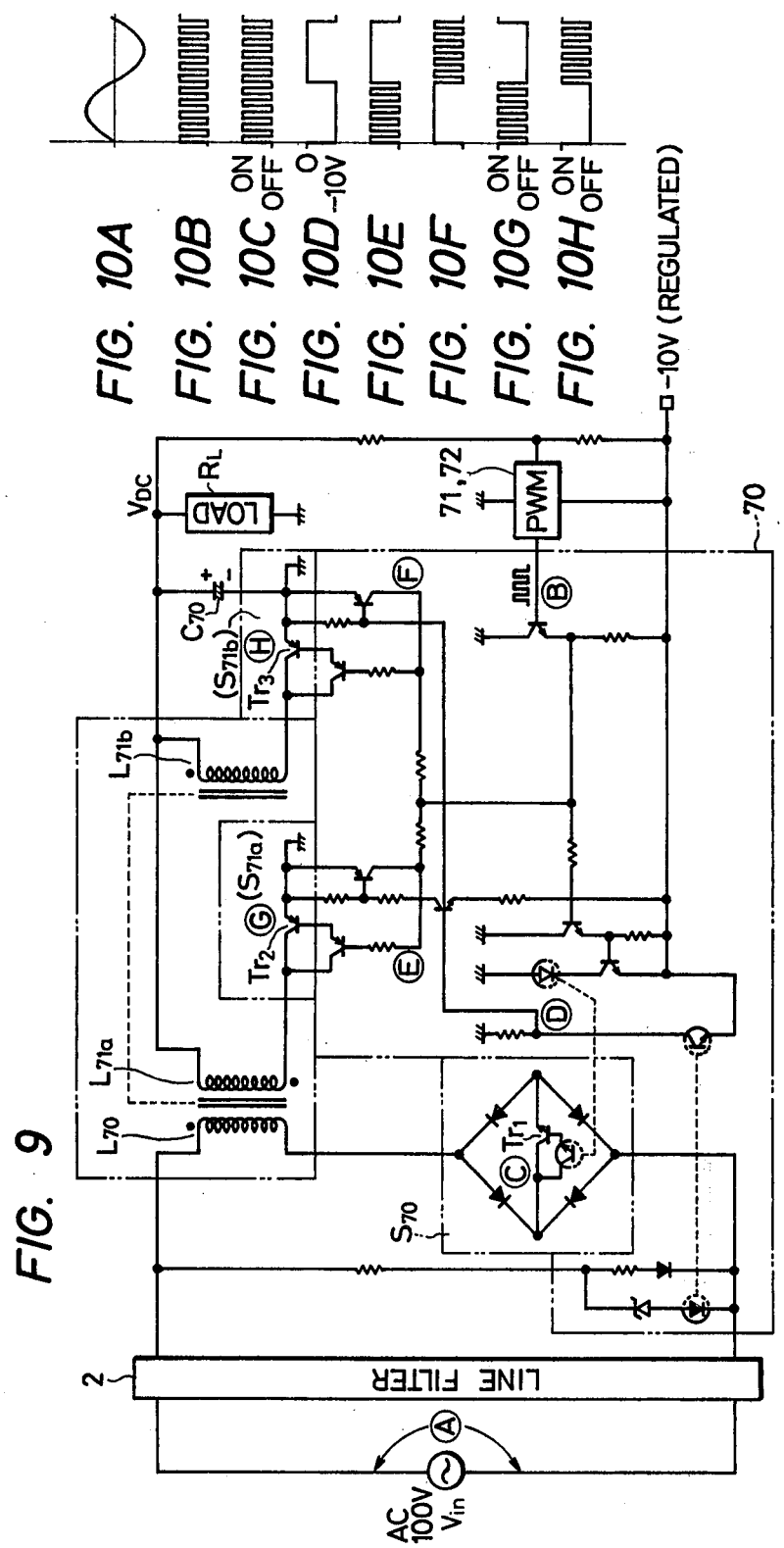

POWER SUPPLY CIRCUIT FOR ELECTRICAL APPARATUS

BACKGROUND OF THE INVENTION (a) Field of the Invention

The present invention concerns an improvement in power supply circuits designed so that an AC voltage is applied to a transformer and the output at the secondary winding thereof is rectified and smoothed to derive a DC voltage.

(b) Description of the Prior Art

In the past, conventional power supply circuits of the abovesaid type is arranged so that, in case of, for example, a power supply circuit designed to perform full wave rectification, the charge current for the smoothing capacitor on the secondary side of the transformer flows concentrically in one time for a half cycle of the input voltage. Accordingly, the input current will have a pulse-like waveshape. For this reason, it should be understood that, in case the load is very light or in case it is absent, the peak value of the input current is low, but in case the load is heavy, the peak value of the input current becomes very large, which leads to the following inconveniences.

(1) Because the peak value of the input current is large, copper loss which is determined by $I^2 \cdot R$ (wherein: I represents the value of current; and R represents the resistance value of the winding of the transformer) will become large, with the result that the efficiency of the circuit becomes poor.

(2) Since the input current is a pulse-like one having a large peak value, the rate of variation of current $dI/dt$ is large, and the radiating noises become large, and furthermore because of the abundance of higher harmonic components contained in the input current itself, noises are generated. These noises may be removed to some extent by the inclusion of a shield or a filter, but there is a limit to doing so.

In addition to the above-mentioned known type of power supply system, there has been proposed a power supply circuit which is of the type called "switching regulator". This system is arranged to be operative so that an AC voltage is converted once to a DC voltage which is then converted to a pulse signal by a switching circuit using a high frequency, and this pulse signal is transformed into a required voltage by a transformer, and the resulting voltage is rectified and smoothed to thereby obtain a desired DC voltage. In this latter power supply system also, the current flowing in the current-rectifying and smoothing circuit on the primary side becomes a squeezed pulse-like narrow current as in the preceding prior art power supply circuit, and involves the problem of noise generation as in the preceding case. In the known power supply system just described above, the loss of power is produced mainly in the current-rectifying elements, and therefore this power supply system not only is disadvantageous in respect of efficiency, but also the generation of heat in the rectifying elements provides a problem. Accordingly, there has been the need to use a rectifying circuit having a large permissible current capacity. Furthermore, the degree of occupation of volume by the rectifying elements and the smoothing capacitor on the primary side in the known power supply system of this type amounts to about ½ to ⅓ of the whole system. Thus, these constituent components of the system contribute to an increase in the size of the whole power supply circuit, and thus to an increase in the manufacturing cost.

Also, with the aim to prevent the loss due to the exciting current of a transformer in the known power supply circuit which is designed to apply an AC voltage to the transformer so that the output on the secondary side thereof is rectified and smoothed to derive a DC voltage, and also to prevent an increase in the size of the transformer which is resulted from the need of said exciting current, there has been proposed a power supply circuit intended to perform switching-control, at the primary side of the transformer, of the AC voltage which is applied to the primary side of this transformer. For this matter, reference should be made to, for example, the copending U.S. Pat. application Ser. No. 129,642, U.S. Pat. No. 4,051,425, U.S. Pat. No. 3,466,527, U.S. Pat. No. 3,723,849 and U.S. Pat. No. 3,506,905. However, in these known power supply circuits, it should be understood that, although the problems concerning the efficiency and the increase in the size of the system resulting from an exciting current may be avoided, there still are entailed by such problems as the decrease in efficiency and the generation of noises due to the concentration of current as in the case of the abovesaid prior art power supply circuits.

SUMMARY OF THE INVENTION

A primary object of the present invention, therefore, is to provide a power supply circuit designed so that the peak value of the input current can be suppressed to a small level.

A second object of the present invention is to provide a power supply circuit of the type described above, which is small in power dissipation and high in efficiency which can be realized by suppressing the peak value of the input current to a small level.

A third object of the present invention is to provide a power supply circuit of the type described above, which reduces noise components due to the fact that the peak value of the input current is suppressed to a low level, and which allows easy elimination of any noise components by the provision of a shield or a filter means.

A fourth object of the present invention is to provide a power supply circuit of the type described above, which gives rise to no problem of generation of heat of the rectifying device which has been encountered in the switching regulator of the prior art, and which can contribute to the prevention of an increase in the size of the circuit system as a whole and in the manufacturing cost.

A fifth object of the present invention is to provide a power supply circuit of the type described above, which is arranged so that almost all parts of the input voltage waveshape can be utilized in deriving a DC output.

A sixth object of the present invention is to provide a power supply circuit of the type described above, which is designed so that, during a half cycle of the input voltage, this voltage is subjected to switching at least twice before being applied to the primary side of the transformer.

BRIEF DESCRIPTION OF THE DRAWINGS

FIGS. 3A to 3D are illustrations showing the waveshapes in the respective parts of the circuit of FIG. 1.

FIGS. 5A to 5K are illustrations showing the waveshapes in the respective parts of the circuit of FIG. 4.

FIGS. 8A to 8C are illustrations of the waveshapes in the respective parts of the circuit of FIG. 7.

FIG. 9 is a concrete circuit diagram of the embodiment shown in FIG. 7.

FIGS. 10A to 10H are illustrations showing the waveshapes in the respective parts of the circuit of FIG. 9.

DETAILED DESCRIPTION OF THE PREFERRED EMBODIMENTS

Figure 1:
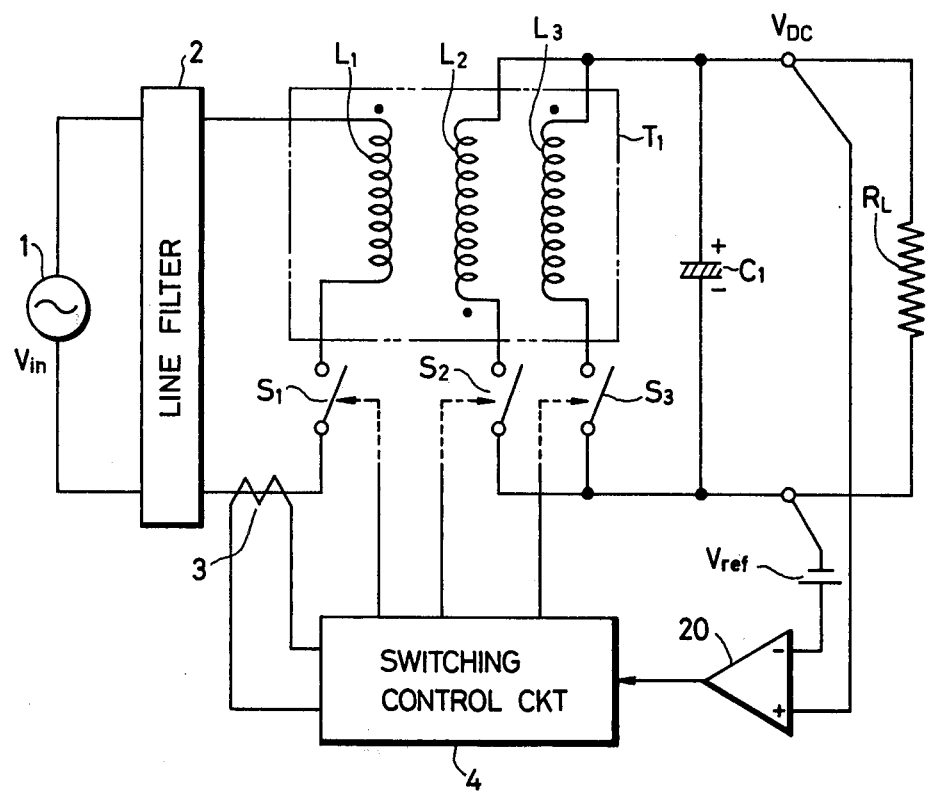
FIG. 1 is a block diagram showing an embodiment of the present invention.

In FIG. 1, a primary coil $L_1$ and secondary coils $L_2$ and $L_3$ are wound, in such polarities as shown, around a core (made of, for example, ferrite) of a power supply transformer $T_1$. The primary coil $L_1$ is connected to a commercial AC power supply 1 via a line filter 2 and to a series-connected switch $S_1$. A switch $S_2$ is intended to perform switching of an input voltage $V_{in}$ from the AC power supply 1 with a cycle smaller than the half cycle of this voltage $V_{in}$, i.e. switching performed a plurality of times during each half cycle of the AC input voltage. The switch $S_1$ may be constructed by a bidirectional device such as "triac" (commercial name).

The secondary coil $L_2$ is series-connected to said switch $S_2$, and the secondary coil $L_3$ is series-connected to a switch $S_3$. These switches $S_2$ and $S_3$ are intended to rectify those AC components which are generated on the secondary side of the transformer $T_1$ as a result of the switching done on the primary side of this transformer. These switches $S_2$ and $S_3$ are turned "on" and "off" alternately in association with the on-off action of the switch $S_1$. Since these switches $S_2$ and $S_3$ are intended to cause a current to flow only in one direction, they may be constructed with unidirectional devices such as transistors and diodes having a sufficiently high reverse breakdown voltage. The provision of two secondary coils $L_2$ and $L_3$ is for the purpose of deriving a voltage of only a single direction by changing-over the connection of the coils to be used in accordance with the positive or negative polarity of the input voltage $V_{in}$. The voltages induced in the secondary coils $L_2$ and $L_3$ are derived via their associated switches $S_2$ and $S_3$, respectively, and they are then smoothed by a capacitor $C_1$ before being supplied to a load $R_L$.

The line filter 2 which is inserted on the primary side of the transformer $T_1$ is intended to inhibit a ripple current caused by switching operation from flowing into the power supply side.

In the embodiment of FIG. 1, power transmission is performed in such manner that when, as the switch $S_1$ is turned "on", the primary current has gained a predetermined value $I_x$, this switch $S_1$ is turned "off", and that, concurrently therewith, the switches $S_2$ and $S_3$ are kept conductive for a predetermined length of time. Since the switch $S_1$ is turned "off" when the primary current has gained the predetermined value $I_x$, the peak value of the primary current may be limited to an appropriate small level. A current detector 3 is assigned to detect a primary current for the controlling of these switches $S_1$, $S_2$ and $S_3$.

A switching control circuit 4 is intended to control the switching operations of the switches $S_1$, $S_2$ and $S_3$ in accordance with the detection of a primary current done by the current detector 3.

A comparator 20 is intended to compare an output voltage $V_{DC}$ which is applied to the load $R_L$ with a reference voltage $V_{ref}$. The output of this comparator 20 is inputted to said switching control circuit 4, to thereby control the length of time in which the switch $S_1$ is kept conductive. Whereby, the output voltage $V_{DC}$ is held always at a constant value corresponding to the reference voltage $V_{ref}$. More particularly, in case the output voltage $V_{DC}$ becomes low, the length of time that the switch $S_1$ is kept conductive is prolonged so as to allow a large power to be transmitted to the secondary side of the transformer $T_1$. Conversely, when the output voltage $V_{DC}$ becomes high, the length of time in which the switch $S_1$ is kept conductive is shortened to thereby limit the transmission of power to the secondary side.

The switching control operation by the switching control circuit 4 is performed, in practice, in the manner as described below.

Figure 2A:
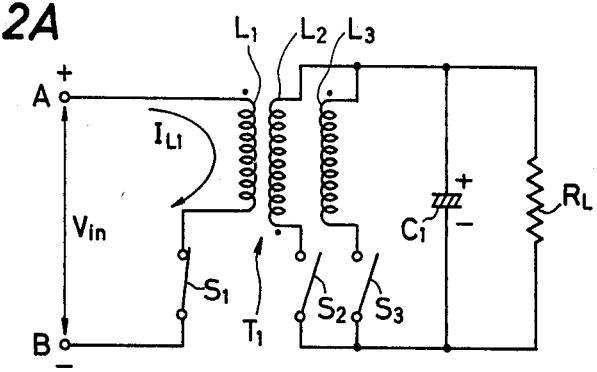
FIGS. 2A to 2C are illustrations for explaining the operation of the circuit shown in FIG. 1.

(1) In case the switch $S_1$ is turned "on" when the polarities of the AC input voltage $V_{in}$ are positive at terminal A and negative at terminal B as shown in FIG. 2A, there flows a primary current $I_{L1}$ in such direction as indicated by the arrow in FIG. 2A. During this part of operation, the switches $S_2$ and $S_3$ are both set nonconductive. As the primary current $I_{L1}$ progressively increases, there is accordingly stored an electric energy in the core of the transformer $T_1$. When the current detector 3 has detected the fact that the primary current $I_{L1}$ has reached a predetermined current level $I_x$, the switch $S_1$ is turned "off". Concurrently therewith, either the switch $S_2$ or the switch $S_3$ is turned "on" as the case may be. This selection of either the switch $S_2$ or $S_3$ is determined by the direction of the primary current $I_{L1}$, i.e. by the polarity of the AC input voltage $V_{in}$. In case the direction of the primary current $I_{L1}$ is as shown in FIG. 2A, the switch $S_2$ is turned "on".

Figure 2B:
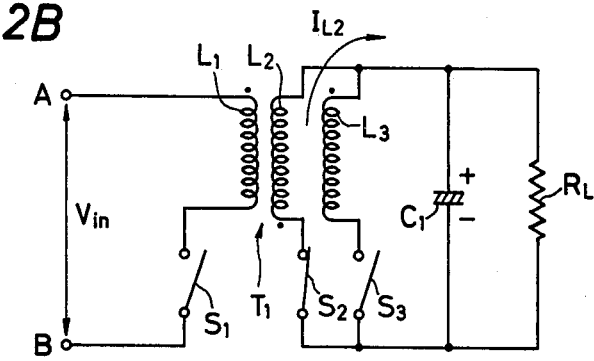

(2) When the switch $S_2$ is thus turned "on", the electric energy which has been stored in the core of the transformer $T_1$ will become a current $I_{L2}$ as shown in FIG. 2B, which flows in the direction indicated by an arrow shown therein. This current $I_{L2}$ is smoothed by the capacitor $C_1$ and is supplied to the load $R_L$.

(3) The switch $S_2$ will be turned "off" at the end of a predetermined length of time $T_x$ after it has been turned "on". Concurrently therewith, the switch $S_1$ is turned "on", and the above-stated operation is repeated.

Figure 2C:
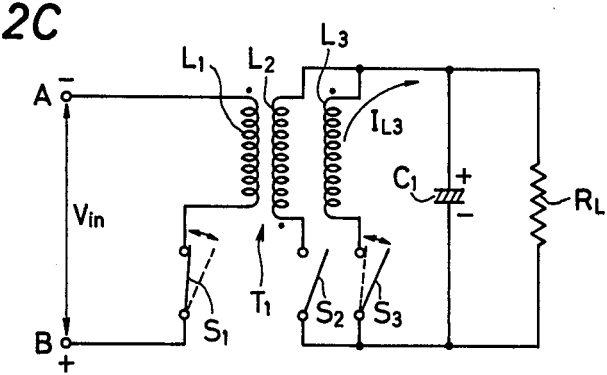

(4) In case the polarities of the AC input voltage $V_{in}$ are reversed, i.e. when the polarity at terminal A is negative and the polarity at terminal B is positive as shown in FIG. 2C, the switch $S_3$, rather than the switch $S_2$, is turned "on" and "off". Since the secondary coil $L_3$ is wound so as to have a polarity opposite to that of the other secondary coil $L_2$, a secondary current $I_{L3}$ will flow in the same direction as that of said current $I_{L2}$ as indicated by the arrow in the Figure. In other words, the direction of the secondary current will become constant irrespective of the direction of the primary current $I_{L1}$.

FIG. 3 shows the waveshapes indicating the respective operating state described above. FIG. 3A represents the waveshape of the AC input voltage $V_{in}$. FIG. 3B represents the waveshape of the primary current $I_{L1}$. FIG. 3C represents the waveshape of the secondary current $I_{L2}+I_{L3}$. FIG. 3D represents the waveshape of the primary current which flows on the input side of the line filter 2. As shown in FIG. 3B, the duration or time interval $T_x$ of the conducting state of the switches $S_2$ and $S_3$ is constant. However, the duration or time interval $T_y$ of conducting state of the switch $S_1$ will vary in accordance with the instantaneous voltage of the AC input voltage $V_{in}$. More particularly, in case the instantaneous voltage is low, there is required some time before a set current value $I_x$ is gained. Accordingly, the duration $T_y$ for the switch $S_1$ will be prolonged. On the other hand, when the instantaneous voltage is high, the set current value $I_x$ is reached immediately. Thus, the duration $T_y$ for the switch $S_1$ will become short. The reason why the peak values of the currents $I_{L2}$ and $I_{L3}$ are constant regardless of the variation of the instantaneous value of the AC input voltage $V_{in}$ as shown in FIG. 3C is because of the fact that the electric energy which is stored in the core of the transformer $T_1$ is held always constant by virtue of the manner of controlling that the switch $S_1$ is continuously kept at its conducting state until the primary current $I_{L1}$ reaches the set value $I_x$. Also, thanks to such manner of controlling, the primary current $I_{L1}$ will have a phase same as that of the AC input voltage $V_{in}$ as shown in FIG. 3D, and furthermore the value of this primary current $I_{L1}$ will have a constant small value when viewed on an average.

In case the output voltage $V_{DC}$ becomes lower than the reference voltage $V_{ref}$, the final value of the primary current $I_{L1}$ will rise as shown by the broken line in FIG. 3 owing to the action of the comparator 20, whereby the secondary current $I_{L2}+I_{L3}$ will increase, so that the output voltage $V_{DC}$ is held at the predetermined value.

Figure 4:
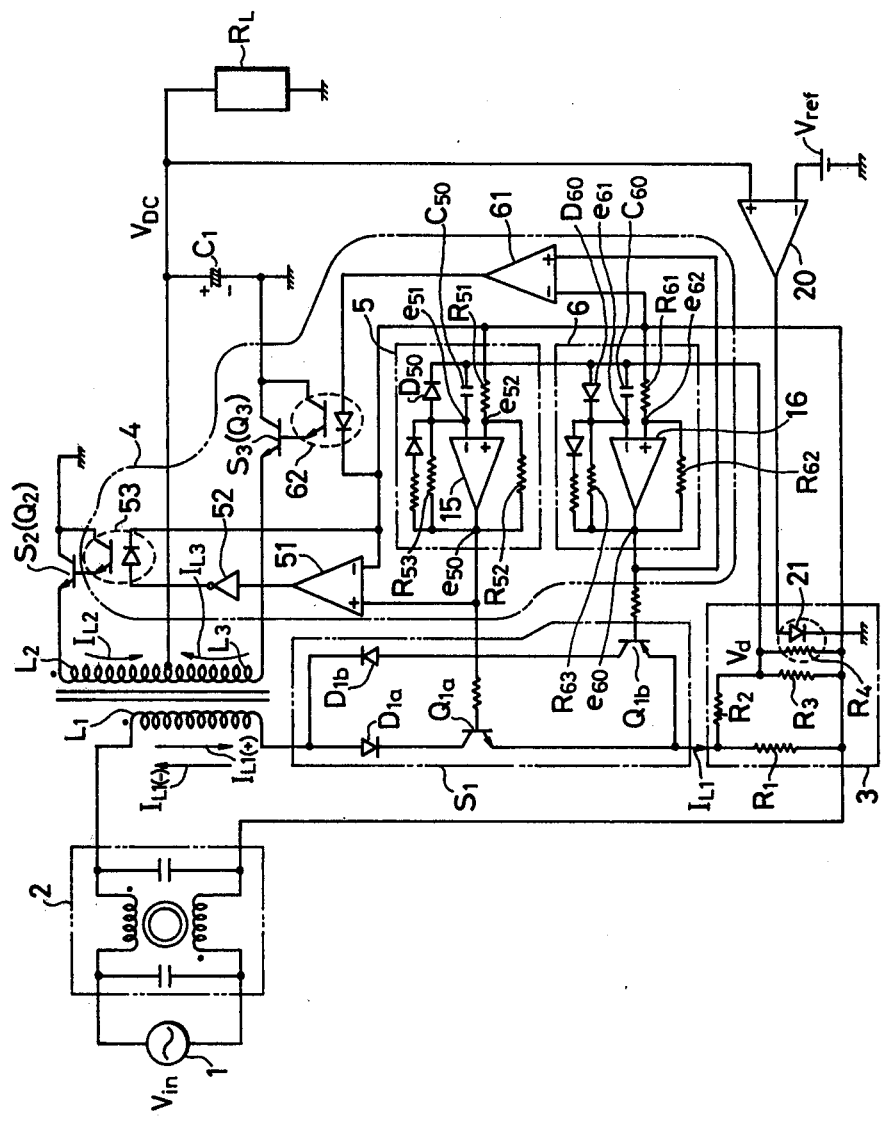
FIG. 4 is a circuit diagram showing the details of the circuit of FIG. 1.

FIG. 4 shows the details of the circuit of FIG. 1. In FIG. 4, the line filter 2 is constructed with a $\pi$ type filter. The switch $S_1$ is composed of two transistors $Q_{1a}$ and $Q_{1b}$ and two diodes $D_{1a}$ and $D_{1b}$. The transistor $Q_{1a}$ is rendered "on" and "off" when the direction of the primary current $I_{L1}$ is as shown by an arrow $I_{L1(+)}$. On the other hand, the transistor $Q_{1b}$ is rendered "on" and "off" when the direction of the primary current $I_{L1}$ is as shown by the arrow $I_{L1(-)}$. It should be understood here that the switch $S_1$ may be formed also with such bidirectional device as "triac" in place of the two transistors $Q_{1a}$ and $Q_{1b}$. In this embodiment, the switches $S_2$ and $S_3$ are composed of a transistor $Q_2$ and a transistor $Q_3$, respectively.

The current detector 3 here is comprised of a circuit which represents a combination of resistors $R_1$, $R_2$, $R_3$ and $R_4$, and serves to detect the magnitude of the primary current $I_{L1}$ in the form of its corresponding voltage $V_d$.

In the switching control circuit 4, a monostable multivibrator 5 is assigned to cause the switching of the switches $S_1$ and $S_2$ in case the polarity of the AC input voltage $V_{in}$ is positive.

More specifically, the transistor $Q_{1a}$ is rendered "on" and "off" by an output $e_{50}$ of an operational amplifier 15 to thereby cut off and connect the primary current $I_{L1(+)}$. Concurrently therewith, by reversing the polarity of the output $e_{50}$ via a comparator 51 and an inverter 52, and further by driving a photo-coupler 53, the transistor $Q_2$ is rendered "on" and "off" alternately with the transistor $Q_{1a}$ for the conduction of a secondary current. In this instance, the reference voltage for the voltage $V_d$, i.e. the voltage corresponding to the set current $I_x$, is determined by the ratio of resistance between resistors $R_{51}$ and $R_{52}$. Also, the duration $T_x$ of the conductive state of the switch $S_2$ is determined by a time constant $R_{53} \times C_{50}$ of the resistor $R_{53}$ and a capacitor $C_{50}$.

A monostable multivibrator 6 is intended to perform the switching of the switches $S_1$ and $S_2$ with respect to the instance wherein the polarity of the AC input voltage $V_{in}$ is negative. More specifically, the transistor $Q_{1b}$ is rendered "on" and "off" by an output $e_{60}$ of an operational amplifier 16, to thereby cut off and connect the primary current $I_{L1(-)}$, and the output $e_{60}$ is supplied to a photo-coupler 62 via a comparator 61 to thereby alternately render the transistors $Q_{1b}$ and $Q_2$ "on" and "off" relative to each other, to conduct a secondary current $I_{L2}$. In this instance, the reference voltage for the voltage $V_d$ is determined by the ratio of resistance between resistors $R_{61}$ and $R_{62}$. Also, the duration $T_x$ of conduction of the switch $S_3$ is determined by a time constant $R_{63} \times C_{60}$ of the resistor $R_{63}$ and the capacitor $C_{60}$.

The comparator 20 drives a light-emitting diode 21 when the output voltage $V_{DC}$ becomes lower than the reference voltage $V_{ref}$. The resistor $R_4$ of the current detector 3 is comprised of a photo-conductive device, which operates so that its resistance value decreases when the photodiode 21 is driven. Accordingly, in such instance, the length of time $T_y$ which is required for the voltage $V_d$ to gain a predetermined value is prolonged. The primary current $I_{L1}$ will flow in a greater abundance corresponding to the prolonged length of time, so that the energy which is transmitted to the secondary side increases, and thus the output voltage $V_{DC}$ is elevated. By virtue of such feedback controlling, the output voltage $V_{DC}$ is held at a constant value.

FIG. 5 shows the waveshapes at the respective parts of the circuit of FIG. 4. Based on FIG. 5, the operation of the circuit of FIG. 4 will be explained below.

(1) In case the polarity of $V_{in}$ is positive

In the monostable multivibrator 5, the output $e_{50}$ of the operational amplifier 15 is changed over between high level (positive power supply voltage $+V_{cc}$) and low level (negative power supply voltage $-V_{cc}$) in accordance with the relative magnitude of the voltage $e_{51}$ at the inverting input terminal and the voltage $e_{52}$ at the non-inverting input terminal of the amplifier 15, as shown in FIG. 5D. The voltage $e_{51}$ at the inverting input terminal varies in accordance with the voltage $V_d$ which corresponds to said primary current $I_{L1(+)}$ as shown in FIGS. 5B and 5C. The voltage $e_{52}$ at the non-inverting input terminal will take either one of the binary values $+R_{51} \cdot V_{cc}/(R_{51}+R_{52})$ and $-R_{51} \cdot V_{cc}/(R_{51}+R_{52})$ in accordance with the output voltage $e_{50}$, as shown in FIG. 5D. This voltage serves as the reference voltage for the voltage $e_{51}$ at the non-inverting input terminal. Accordingly, for example, at timing $t_1$ of FIG. 5, if the output voltage $e_{50}$ of the operational amplifier 15 has been shifted to high level $+V_{cc}$ from low level $-V_{cc}$, causing the transistor $Q_{1a}$ to be turned "on", thus allowing a primary current $I_{L1(+)}$ to flow, and when accordingly the voltage $V_d$ rises, the voltage $e_{51}$ at the inverting input terminal will also rise, being $V_d+V_F$ (wherein: $V_F$ represents a forward voltage of a diode $D_{50}$). When, at timing $t_2$, its value exceeds the voltage $+R_{51} \cdot V_{cc}/(R_{51}+R_{52})$ at the non-inverting input terminal, the operational amplifier 15 will be inverted so that its output voltage $e_{50}$ will go down to low level $-V_{cc}$. Whereby the transistor $Q_{1a}$ is rendered "off", and the primary current $I_{L1(+)}$ is cut off. Thus, the final value of the primary current $I_{L1(+)}$ always becomes a constant value in spite of the variation of the instantaneous value of the AC input voltage $V_{in}$, and a constant energy is stored in the core of the transformer $T_1$. The length of time $T_y$ in which the transistor $Q_{1a}$ is held conductive will vary in accordance with the instantaneous value of the AC input voltage $V_{in}$. More particularly, when the instantaneous value of the AC input voltage $V_{in}$ is small, the primary current $I_{L1(+)}$ will exhibit a gentle increase, so that the duration $T_y$ will become prolonged. On the other hand, in case the instantaneous value is large, the primary current $I_{L1(+)}$ will show an abrupt increase, so that the duration $T_y$ will become short.

When the output voltage $e_{50}$ of the operational amplifier 15 assumes low level, the voltage $e_{52}$ at the non-inverting input terminal will be changed over to $-R_{51} \cdot V_{cc}/(R_{51}+R_{52})$, and thus the state of low level of the output voltage $e_{50}$ is retained. At such instance, the output voltage $e_{50}$ drives the photo-coupler 53 via the comparator 51 and an inverter 52, to thereby render the transistor $Q_2$ conductive. Whereby the electric energy which has been stored in the core of the transformer $T_1$ is allowed to flow to serve as a secondary current $I_{L2}$. Since the electric energy which is stored in the core by virtue of the primary current $I_{L1(+)}$ is constant in spite of the instantaneous value of the AC input voltage $V_{in}$, the peak value of the secondary current $I_{L2}$ also becomes constant as shown in FIG. 5K.

When the output voltage $e_{50}$ of the operational amplifier 15 is at low level, the voltage $e_{51}$ at the inverting input terminal progressively approaches the voltage of $e_{50}$ with a time constant $R_{53} \times C_{50}$. When, at timing $t_3$, the voltage $e_{51}$ becomes lower than the voltage of $e_{52}$, this will serve to invert the operational amplifier 15 again, rendering its output voltage $e_{50}$ to high level, and thus the transistor $Q_{1a}$ is rendered conductive, whereas the transistor $Q_2$ is rendered non-conductive. The length of time required for the voltage $e_{51}$ to reach the level $e_{52}$ is a constant value $T_x$ which is determined by a time constant $R_{53} \times C_{50}$.

It should be understood here that when the polarity of the AC input voltage $V_{in}$ is positive, the primary current $I_{L1(+)}$ will not be allowed to flow to the transistor $Q_{1b}$ because of the diode $D_{1b}$. Also, it should be noted that in the monostable multivibrator 6, the voltage $e_{61}$ at the inverting input terminal corresponding to the voltage $V_d$ is always higher than the reference voltage $-R_{61} \cdot V_{cc}/(R_{61}+R_{62})$ as is seen in FIG. 5G, the output voltage $e_{60}$ of the operational amplifier 16 remains at its low level. Accordingly, the transistor $Q_3$ will not be rendered "on", and accordingly no current will flow to the secondary coil $L_3$.

(2) In case the polarity of $V_{in}$ is negative

In the monostable multivibrator 6, the output voltage $e_{60}$ of the operational amplifier 16 will be switched over between high level and low level in accordance with the relative magnitude of the voltage $e_{61}$ at the inverting input terminal and the voltage $e_{62}$ at the non-inverting input terminal, as seen in FIG. 5H. The voltage $e_{61}$ at the inverting input terminal will vary in accordance with the voltage $V_d$ which is a negative voltage corresponding to said primary current $I_{L1(-)}$, as seen in FIGS. 5B and 5G. On the other hand, the voltage $e_{62}$ at the non-inverting input terminal will assume either one of the binary values $+R_{61} \cdot V_{cc}/(R_{61}+R_{62})$ and $-R_{61} \cdot V_{cc}/(R_{61}+R_{62})$, as seen in FIG. 5H, in accordance with the output voltage $e_{60}$, and this voltage will serve as the reference voltage for the voltage $e_{61}$ at the inverting input terminal. Accordingly, at, for example, timing $t_{11}$ in FIG. 5, when the output voltage $e_{60}$ assumes low level $-V_{cc}$, causing the transistor $Q_{1b}$ to be rendered "on" and accordingly allowing a primary current $I_{L1(-)}$ to flow, and accordingly, the voltage $V_d$ increases in the negative direction, the voltage $e_{61}$ at the inverting input terminal will also increase in the negative direction, being $V_d - V_F$ (wherein $V_F$ represents a forward voltage of a diode $D_{60}$). When, at timing $t_{12}$, its value exceeds the voltage $-R_{61} \cdot V_{cc}/(R_{61}+R_{62})$ at the non-inverting input terminal, the operational amplifier 16 will become inverted, and its output voltage $e_{60}$ will rise to high level $V_{cc}$. Whereupon, the transistor $Q_{1b}$ will be rendered "off", and the primary current $I_{L1(-)}$ is cut off. With this, the final value of the primary current $I_{L1(-)}$ always becomes a constant value in spite of the instantaneous value of the AC input voltage $V_{in}$, and a constant energy is stored in the core. The length of time $T_y$ during which the transistor $Q_{1b}$ is kept conductive will vary in accordance with the instantaneous value of the AC input voltage $V_{in}$ the same manner as in the case of the aforesaid transistor $Q_{1a}$. That is, in case the instantaneous value is small, the primary current $I_{L1(-)}$ will increase gently, so that the duration $T_y$ will become prolonged. On the other hand, in case the instantaneous value is large, the primary current $I_{L1(-)}$ will increase abruptly, so that the duration $T_y$ will become short.

When the output voltage $e_{60}$ of the operational amplifier 16 assumes high level, the voltage $e_{62}$ at the non-inverting input terminal is switched over to $+R_{61} \cdot V_{cc}/(R_{61}+R_{62})$, and thus the state of high level of the output voltage $e_{60}$ is maintained. The output at such time drives the photo-coupler 62 via the comparator 61, to thereby render the transistor $Q_3$ conductive. Whereby, the electric energy which has been stored in the core is allowed to flow as a secondary current $I_{L3}$. On the other hand, the electric energy which is stored in the core by the primary current $I_{L1(-)}$ is constant in spite of the instantaneous value of the AC input voltage $V_{in}$, so that the peak value of the secondary current $I_{L3}$ will be constant as shown in FIG. 5K.

In case the output voltage $e_{60}$ of the operational amplifier 16 assumes high level, the voltage $e_{61}$ at the inverting input terminal approaches the voltage of $e_{60}$ with a time constant $R_{63} \times C_{60}$. When the voltage $e_{60}$ exceeds the voltage of $e_{62}$ at timing $t_{13}$, it inverts the operational amplifier 16 again, rendering its output voltage $e_{60}$ to low level, and renders the transistor $Q_{1b}$ conductive, and concurrently therewith renders the transistor $Q_3$ non-conductive. The time required for the voltage $e_{61}$ to reach the voltage of $e_{62}$ is a constant value $T_x$ which is determined by a time constant $R_{63} \times C_{60}$.

It should be understood that, in case the polarity of the AC input voltage $V_{in}$ is negative, the primary current $I_{L1(-)}$ will not flow to the transistor $Q_{1a}$ because of the diode $D_{1a}$. Also, in the monostable multivibrator 5, the voltage $e_{51}$ at the inverting input terminal corresponding to the voltage $V_d$ is always lower than the reference voltage $+R_{51} \cdot V_{cc}/(R_{51}+R_{52})$, as shown in FIG. 5c, so that the output voltage $e_{50}$ of the operational amplifier 15 will remain in its high level state. Accordingly, the transistor $Q_2$ is not turned "on", and no current will flow to the secondary coil $L_2$.

As described above, in the circuit of FIG. 4, the primary current $I_{L1}$ is directly restricted, so that its peak value can be made to have a desired value. In particular, the waveshape of the AC input voltage participates entirely in the transmission of electric energy by virtue of the controlling of switching action, so that its peak value can be set at a low value. Accordingly, copper loss $I^2 \cdot R$ is minimized and efficiency is enhanced. Not only that, but dI/dt becomes small and radiation noises are reduced, and the higher harmonic components contained in the input current are reduced also.

As described above, in the embodiment shown in FIG. 1, there is provided a single primary coil and there are provided two secondary coils, and arrangement is made so that these two secondary coils are selectively used by the switches $S_2$ and $S_3$ in accordance with the polarity of the AC input voltage $V_{in}$. However, other manners of combination of coils and switches may be considered in addition to that mentioned hereinabove, such as those shown in FIGS. 6A, 6B and 6C.

Figure 6A:
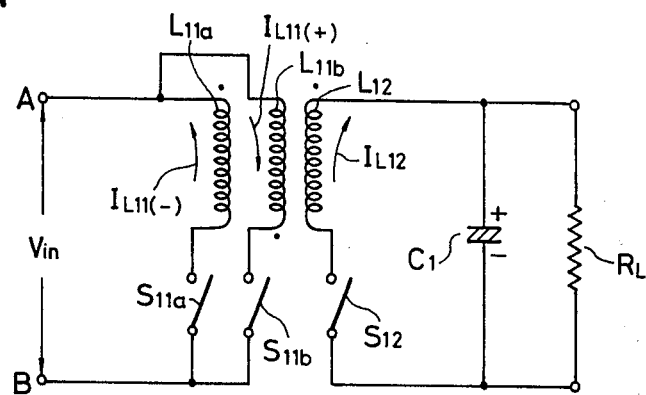
FIGS. 6A to 6C are illustrations showing some modifications of combination of switches and coils in FIG. 1.

FIG. 6A shows an arrangement such that, conversely of the embodiment of FIG. 1, two coils $L_{11a}$ and $L_{11b}$ are disposed on the primary side in such way that these coils have mutually opposing polarities, and a single coil $L_{12}$ is provided on the secondary side, and that switches $S_{11a}$, $S_{11b}$ and $S_{12}$ are connected to these coils $L_{11a}$, $L_{11b}$ and $L_{11c}$, respectively. In such arrangement, when the polarity of the AC input voltage $V_{in}$ is positive, i.e. positive at terminal A and negative at terminal B, the switch $S_{11b}$ is turned "on" and "off" for the primary side. More particularly, when the switch $S_{11b}$ is turned "on", a primary current $I_{L11(+)}$ flows in the direction indicated by the arrow. When this current has reached a predetermined value, the switch $S_{11b}$ is turned "off" and, concurrently, the switch $S_{12}$ on the secondary side is turned "on". Whereupon, the electric energy which has been stored in the core by the primary current $I_{L11(+)}$ will flow as a secondary current $I_{L12}$, and this current is smoothed by a capacitor $C_1$ to be supplied to a load $R_L$. Also, in case the polarity of the AC input voltage $V_{in}$ is negative, i.e. negative at terminal A and positive at terminal B, the primary side operation is that the switch $S_{11a}$ is turned "on" and "off". When the switch $S_{11a}$ is turned "on", a primary current $I_{L11(-)}$ flows. When this current reaches a predetermined value, the switch $S_{11a}$ is turned "off", and concurrently therewith the switch $S_{12}$ on the secondary side is turned "on". Whereupon, a secondary current $I_{L12}$ flows in the same direction as that in case the AC input voltage $V_{in}$ is of the positive polarity, since the coils $L_{11a}$ and $L_{11b}$ are arranged to have opposing polarities relative to each other, and this secondary current is smoothed by the capacitor $C_1$ and is supplied to the load $R_L$. Accordingly, the result is that the circuit of this embodiment operates in the same manner as that of the embodiment of FIG. 1.

Figure 6B:
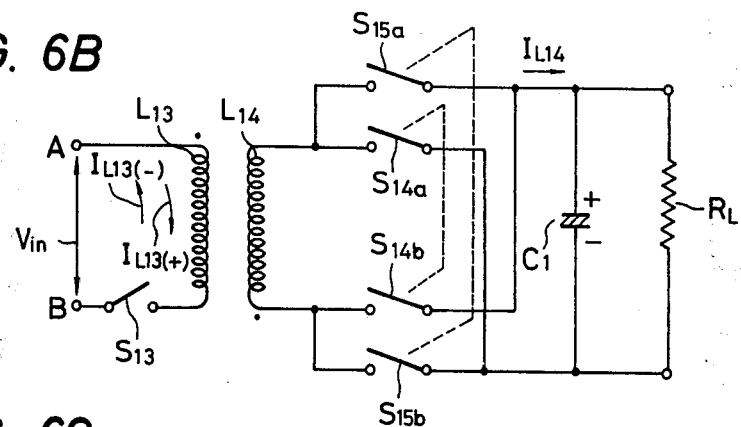

FIG. 6B shows an arrangement that both the primary side and the secondary side are each comprised of a single coil as indicated by $L_{13}$ and $L_{14}$, respectively, so as to change over the connection of the secondary side coil $L_{14}$ relative to a secondary side load $R_L$ in accordance with the polarity of the AC input voltage $V_{in}$. When the polarity of the AC input voltage $V_{in}$ is positive, it will be noted that, by turning a switch $S_{13}$ "on", a primary current $I_{L13(+)}$ will flow in the direction indicated by the arrow. When this current reaches a predetermined value, the switch $S_{13}$ is turned "off", and concurrently therewith the interlocking switches $S_{15a}$ and $S_{15b}$ are turned "on". Whereupon, a secondary current $I_{L14}$ flows in the direction indicated by the arrow, and it is smoothed by a capacitor $C_1$ and is supplied to the load $R_L$. Also, in case the polarity of the AC input voltage $V_{in}$ is negative, the turning of the switch $S_{13}$ "on" causes a primary current $I_{L13(-)}$ to flow. When the value thereof reaches a predetermined level, the switch $S_{13}$ is turned "off" and the interlocking switches $S_{14a}$ and $S_{14b}$ are turned "on". Whereupon, a secondary current $I_{L14}$ will flow in the same direction in this case also, and this current is smoothed by the capacitor $C_1$ and is supplied to the load $R_L$.

Figure 6C:
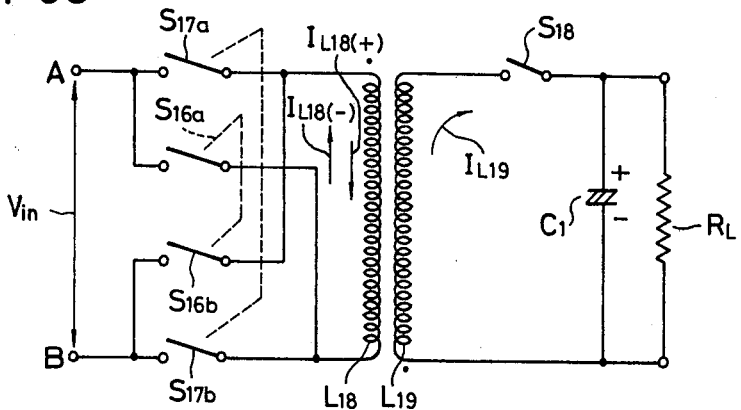

FIG. 6C shows an arrangement that, conversely of the arrangement of switches in FIG. 6B, interlocking switches $S_{16a}$, $S_{16b}$ and $S_{17a}$ and $S_{17b}$ are provided on the primary side, so that the connection of a primary coil $L_{18}$ relative to the AC input is changed over in accordance with the polarity of the AC input voltage $V_{in}$. In case the polarity of the AC input voltage $V_{in}$ is positive, the interlocking switches $S_{17a}$ and $S_{17b}$ are turned "on". At such moment, a primary current $I_{L18(+)}$ flows in the direction indicated by the arrow. When this current $I_{L18(+)}$ has reached a predetermined value, the interlocking switches $S_{17a}$ and $S_{17b}$ are turned "off", and concurrently therewith a switch $S_{18}$ is turned "on". This will induce a secondary current $I_{L19}$, which is smoothed by a capacitor $C_1$ and is supplied to a load $R_L$. In case the polarity of the AC input voltage $V_{in}$ is negative, the interlocking switches $S_{16a}$ and $S_{16b}$ are turned "on". At such instance, a primary current $I_{L18(-)}$ will flow in the direction indicated by the arrow. When this current $I_{L18(-)}$ has arrived at a predetermined value, the interlocking switches $S_{16a}$ and $S_{16b}$ are turned "off", whereas the switch $S_{18}$ is turned "on". Whereby, a secondary current $I_{L19}$ will flow in the same direction as that for the instance wherein the polarity of the AC input voltage $V_{in}$ is positive, and this current is smoothed by the capacitor $C_1$ and is supplied to the load $R_L$.

In the embodiments described above, arrangements are provided so that the switching cycle is varied in accordance with the instantaneous value of the AC input voltage, i.e. in case the voltage $V_{in}$ is small, the switching cycle is prolonged, whereas in case the voltage $V_{in}$ is large, the switching cycle is shortened. It should be understood, however, that such arrangement of the switching cycle is not necessarily required in the present invention. This arrangement is provided just for the purpose of rendering the current value of the input current constant regardless of the instantaneous value of the AC input voltage. It should be noted that the advantage or effect of the present invention is indeed obtained by the arrangement that the entire waveshapes of the AC input voltage are caused to participate in the transmission of electric energy by performing switching action a plurality of times for each one-half cycle of an AC input voltage. Accordingly, even when the switching cycle is set constant, there can be obtained the aimed effect or advantage of the present invention without failure. The embodiment of FIG. 7 shows such an example.

Figure 7:
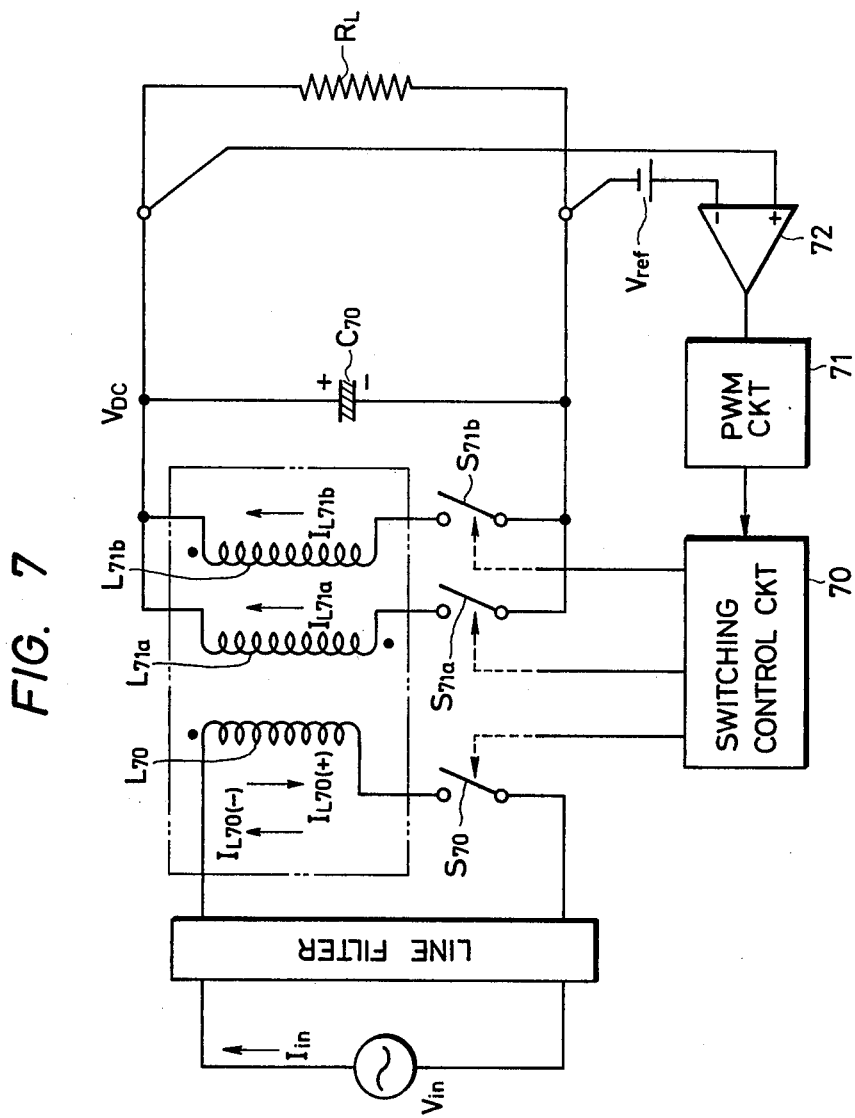
FIG. 7 is a block diagram showing a further embodiment of the present invention.

In FIG. 7, there is provided a single coil $L_{70}$ on the primary side, and two coils $L_{71a}$ and $L_{71b}$ are arranged on the secondary side in a manner similar to that of FIG. 1. To these coils $L_{70}$, $L_{71a}$ and $L_{71b}$ are connected switches $S_{70}$, $S_{71a}$ and $S_{71b}$, respectively. A switching control circuit 70 serves to turn the switch $S_{70}$ "on" and "off" at a constant cycle independently of the value of the primary current, and also turn either the switch $S_{71a}$ or $S_{71b}$ "on" and "off" alternately with the on-off action of the switch $S_{70}$. In case the polarity of the AC input voltage $V_{in}$ is positive, the turning of the switch $S_{70}$ "on" causes a primary current $I_{L70(+)}$ to flow in the direction indicated by the arrow. At the end of a certain length of time, the switch $S_{70}$ is turned "off", and concurrently therewith the switch $S_{71a}$ is turned "on". Whereupon, a secondary current $I_{L71a}$ flows in the direction of the arrow, and this current is smoothed by a capacitor $C_{70}$ and is supplied to a load $R_L$. In case the polarity of the AC input voltage $V_{in}$ is negative, the turning of the switch $S_{70}$ "on" will cause a primary current $I_{L70(-)}$ to flow in the direction of the arrow. At the end of a certain length of time, the switch $S_{70}$ is turned "off", and concurrently therewith the switch $S_{71b}$ is turned "on". Whereupon, a secondary current $I_{L71b}$ flows in the direction of the arrow and is smoothed by the capacitor $C_{70}$ and is supplied to the load $R_L$.

The amount of the current which is transmitted to the secondary side will vary in accordance with the length of time in which the switch $S_{70}$ is in its "on" state, since the switching cycle is constant. Accordingly, by controlling this length of time of making the switch, it is possible to hold the value of an output voltage $V_{DC}$ at a desired level. A pulse-width modulation circuit 71 is intended to perform this controlling. More particularly, the pulse-width modulation circuit 71 performs pulse-modulation of the controlling signal, having a certain cycle, of the switching control circuit 70 based on the result of comparison between a reference voltage $V_{ref}$ and the output voltage $V_{DC}$ which is carried out in a comparator 72, and thus the time of making the switch $S_{70}$ is variably controlled. In case the output voltage $V_{DC}$ has become low, the controlling is performed so that the turning-on duration is prolonged. As a result, the amount of current transmitted to the secondary side increases, so that the output voltage $V_{DC}$ is held at a certain constant magnitude.

FIG. 8 shows the waveshapes at respective parts of the circuit of the embodiment of FIG. 7. FIG. 8A shows a voltage which is applied to the primary coil $L_{70}$. FIG. 8B shows an input current $I_{in}$. FIG. 8C shows the secondary current $I_{L71a}+I_{L71b}$ which flows through the secondary coils $L_{71a}$ and $L_{71b}$. This embodiment differs from that of FIG. 1 in that, in place of the cycle of the current pulse discharged to the secondary side being constant, the current value thereof becomes substantially proportional to the instantaneous value of the AC input voltage $V_{in}$ and does not become constant. However, that part of operation in which the AC input voltage $V_{in}$ is converted to a current and is charged up in the capacitor $C_{70}$ is the same as in the preceding embodiments. Thus, there is no change here in the operation that substantially the entire portions of the waveshapes of the input voltage are utilized to derive a DC current. The waveshape of the input current $I_{in}$ shown in FIG. 8B will become similar to that of the input voltage $V_{in}$ if the capacitor $C_{70}$ has a sufficiently large capacity. It should be noted here that the broken lines in FIG. 8 represent the waveshapes at such time of operation that, when the output voltage $V_{DC}$ has become low, the circuit is operated to return the lowered output voltage back to its initial level by the action of the pulse-width modulation circuit 71.

In the embodiment of FIG. 7 also, it is possible to make such various modifications as shown in FIGS. 6A, 6B and 6C.

FIG. 9 shows a concrete circuit of FIG. 7. Those parts which are identical to those in FIG. 7 are indicated by like reference numerals and symbols, and their description is omitted. It should be noted that the switch $S_{70}$ which is controlled by the switching control circuit 70 is comprised of a transistor $Tr_1$ and its perripheral circuits; the switch $S_{71a}$ is comprised of a transistor $Tr_2$; and the switch $S_{71b}$ is formed with a transistor $Tr_3$. FIGS. 10A through 10H show the waveshapes at the respective points Ⓐ through Ⓗ designated in the circuit of FIG. 9.

It should be noted that the times of applying the AC voltage to the primary winding of the transformer during one-half cycle of the input voltage would preferably be set in such a manner that the frequency of the primary current is greater than the maximum audio frequency, i.e. the frequency of the primary current would be set at the frequency of several tens through several hundreds of kilohertz.

As described above, according to the present invention, arrangement is provided so that an AC input voltage is subjected to switching at least twice during each one-half cycle of said input voltage before being applied to a transformer. Accordingly, the circuit of the present invention will operate so that the instantaneous value of the AC input voltage is converted to a current to be supplied to a load. Thanks to this arrangement, the electric energies of the respective parts of the waveshape of the AC input voltage are utilized. Therefore, as compared with conventional power supply circuits having the same capacity, the present invention has the advantages over them in that the peak value of the input current becomes very small and smooth. As a result, copper loss is reduced and efficiency is enhanced. Also, since dI/dt is small, radiation noises become small, and higher harmonic components contained in the input current also become small, making it easy that they can be eliminated simply by means of a shield or a filter. Furthermore, because of the arrangement that an AC input voltage is directly subjected to switching, the rectification and smoothing on the primary side which have been required in conventional switching regulators become no longer necessary, and accordingly, there arises no problem of heat generation of the rectifying device.

What is claimed is:

1. A power supply circuit for an electrical apparatus, comprising:
 a power transformer having a primary winding adapted to be applied with an AC voltage and having a secondary winding;
 a smoothing circuit connected to the secondary winding of the power transformer;
 first switching means connected in series to said primary winding for applying said AC voltage to said primary winding of said transformer with timing which is at least twice during each one-half cycle of said AC voltage; and
 first detecting means for detecting a current value of said primary winding to control the switching timing of said first switching means by virtue of a result of its detection;
 the controlling of said switching timing being performed so that the current value of said primary winding is kept from exceeding a predetermined value, in such manner that when the current value of the primary winding is less than the predetermined value, the AC voltage is supplied to the primary winding, and that this supply is suspended when the predetermined value is reached.

2. A power supply circuit according to claim 1, further comprising:
first controlling means for performing said switching timing of said first switching means by virtue of a pulse signal of a predetermined cycle.

3. A power supply circuit according to claim 2, further comprising:
second switching means for controlling on-off of connection of said secondary winding relative to said smoothing circuit; and
second controlling means for controlling said second switching means so that said second switching means is turned off when said first switching means is turned on and that the former is turned on when the latter is turned off.

4. A power supply circuit according to claim 1, further comprising:
second detecting means for detecting an output voltage which has been smoothed by said smoothing circuit; and
third controlling means for controlling said predetermined value of the current in accordance with a result of detection done by said second detecting means.

5. A power supply circuit according to claim 2, further comprising:
second detecting means for detecting an output voltage which has been smoothed by said smoothing circuit; and
pulse-width modulating means for performing pulse-width modulation of said pulse signal of said predetermined cycle in accordance with a result of detection done by said second detecting means.

6. A power supply circuit according to claim 1, further comprising:
line filter means inserted between an input terminal of said AC voltage and said primary winding of said transformer for preventing a switching ripple current to flow to said AC voltage side.

7. A power supply circuit for an electrical apparatus, comprising:
a power transformer having a primary winding adapted to be applied with an AC voltage and having a secondary winding;
a smoothing circuit connected to the secondary winding of the power transformer;
first switching means connected in series to said primary winding for applying said AC voltage to said primary winding of said transformer at least twice during each one-half cycle of said AC voltage;
first detecting means for detecting a current value of said primary winding to control the switching timing of said first switching means by virtue of a result of its detection;
the controlling of said switching timing being performed so that the current value of said primary winding is kept from exceeding a predetermined value, in such manner that when the current value of the primary winding is less than the predetermined value, the AC voltage is supplied to the primary winding, and that this supply is suspended when the predetermined value is reached;
second switching means for controlling on-off connection of said secondary winding relative to said smoothing circuit; and
second controlling means for controlling said second switching means so that said second switching means is turned off when said first switching means is turned on and that the former is turned on when the latter is turned off.

8. A power supply circuit according to claim 7, in which:
said primary winding is comprised of a single winding; and
said secondary winding is comprised of two windings,
one of said secondary windings is arranged to have a polarity same as that of said primary winding, and
the other of said secondary windings is arranged to have a polarity opposite to that of said primary winding,
said controlling of the second controlling means being performed so that, during a positive half cycle of said AC voltage, on-off of connection of that secondary winding having a polarity opposite to that of said primary winding is controlled by said second switching means, and that, during a negative half cycle of said AC voltage, on-off of connection of that secondary winding having a polarity same as that of said primary winding is controlled by said second switching means.

9. A power supply circuit according to claim 7, in which:
said primary winding is comprised of two windings; and
said secondary winding is comprised of a single winding,
one of said primary windings is arranged to have a polarity same as that of said secondary winding, and
the other of said primary windings is arranged to have a polarity opposite to that of said secondary winding,
said controlling of the first switching means being performed so that, during a positive half cycle of said AC voltage, on-off of connection of that primary winding having a polarity opposite to that of said secondary winding is controlled by said first switching means, and that, during a negative half cycle of said AC voltage, on-off of connection of that primary winding having a polarity same as that of said secondary winding is controlled by said first switching means.

10. A power supply circuit according to claim 7, in which:
said primary winding and said secondary winding each is comprised of a single winding and that the two windings have polarities which are opposite to each other,
said controlling of the second controlling means being performed so that, during a positive half cycle of said AC voltage, connection of said secondary winding relative to said smoothing circuit is set forward in direction, and this connection is on-off controlled by said second switching means, and that, during a negative half cycle of said AC voltage, connection of said secondary winding relative to said smoothing circuit is set reverse in direction, and that this connection is on-off controlled by said second switching means.

11. A power supply circuit according to claim 7, in which:
said primary winding and said secondary winding each is comprised of a single winding and that the two windings have polarities which are opposite to each other, said controlling of the first switching means being performed so that, during a positive half cycle of said AC voltage, connection of said primary winding relative to the input terminal of said AC voltage is set forward in direction, and this connection is on-off controlled by said first switching means, and that, during a negative half cycle of said AC voltage, connection of said primary winding relative to the input terminal of said AC voltage is set reverse in direction, and that this connection is on-off controlled by said first switching means.

12. A power supply circuit comprising:

a power transformer including a primary winding adapted to receive an AC voltage and a secondary winding for providing a transformed voltage;

a smoothing circuit connected to the secondary winding to provide a smoothed output voltage;

first switching means connected in series with the primary winding; and control means for controlling the first switching means to prevent the current in the primary winding from exceeding a predetermined level, wherein the control means operates to cause the switching means to apply the AC voltage to the primary winding at least twice during each half cycle of the AC voltage.

13. A power supply circuit according to claim 12 including:

second switching means for controlling the connection between the secondary winding and the smoothing circuit; and second control means for controlling the second switching means so that when the AC voltage is connected to the primary winding the secondary winding is disconnected from the smoothing circuit and when the AC voltage is disconnected from the primary winding the secondary winding is connected to the smoothing circuit.

* * * * *